Nov. 24, 1925.

H. W. GOODALL 1,562,954

FLEXIBLE HOSE

Filed May 4, 1923

WITNESS:

INVENTOR

Howard W. Goodall
BY
Augustus B. Stoughton.
ATTORNEY.

Patented Nov. 24, 1925.

1,562,954

UNITED STATES PATENT OFFICE.

HOWARD W. GOODALL, OF ALDAN, PENNSYLVANIA.

FLEXIBLE HOSE.

Application filed May 4, 1923. Serial No. 636,527.

*To all whom it may concern:*

Be it known that I, HOWARD W. GOODALL, a citizen of the United States, residing at Aldan, in the county of Delaware and State of Pennsylvania, have invented a new and useful Improvement in Flexible Hose, of which the following is a specification.

Hitherto each length of flexible hose, more particularly flexible hose of large size, was, in the making, provided at its ends with a short piece of metal pipe of which a part entered the end of the hose for a short distance and was permanently secured to the interior of the hose, and of which a part projected beyond the end of the hose and was externally threaded and used, usually in connection with a flange mounted on its external thread, for coupling lengths of hose together. Flexible hose is generally made of layers of duck and rubber or like material. In use the wall of the hose usually weakens or breaks in rear of and comparatively close to the inner end of the coupling. In such cases and as hitherto constructed the entire length of hose had to be and was discarded and was not of further use because a piece of pipe could not be inserted into the end of the portion of the length of hose that remained in good condition. Coupling pipes had to be attached to the hose in the course of its manufacture or had to be primarily connected with the hose. In fact the coupling pipes were applied at the ends of a pole and the layers of duck and rubber were wound around the pole and pipes prior to vulcanization.

The principal objects of the present invention are, first, to effect an economy in the use of the hose; second, to provide for the continued use of a length of hose even after the rupture of its wall near and in rear of the coupling or at some point along its length; third, to facilitate the re-use or continued use of the good portions of such lengths of hose by simplifying and making easy and possible their connection with other lengths of hose; and fourth, to strengthen and make more durable the connection or bond between the wall of the hose and the coupling element or sleeve. Other objects of the invention will appear from the following description.

The invention, stated broadly, may be said to comprise a flexible hose internally provided throughout its length with spaced coupling elements available for repair use by cutting out defective or ruptured portions of the hose and in the case of ruptured end portions they may be cut off along with the coupling element forming part thereof, so that a coupling element in the remaining good portion of the length of hose can be connected with other lengths of hose. The invention further comprises projections in spaced relation provided on the coupling element or sleeve and extending through the wall of the hose to receive the application of a wrench useful in connecting the coupling element or sleeve and a pipe section, and the invention further comprises the provision of anchor plates connected with such projections and provided with pins and embedded in the wall of the hose which encircles the coupling element.

The invention also comprises the improvements to be presently described and finally claimed and in the description reference will be made to the embodiment of the invention selected from among other embodiments for illustration in the accompanying drawings forming part hereof and in which Figure 1 is a view, partly in section and partly in elevation, illustrating a portion of a length of flexible hose having a coupling element embedded in the intermediate portion of its inner wall.

Figure 1:
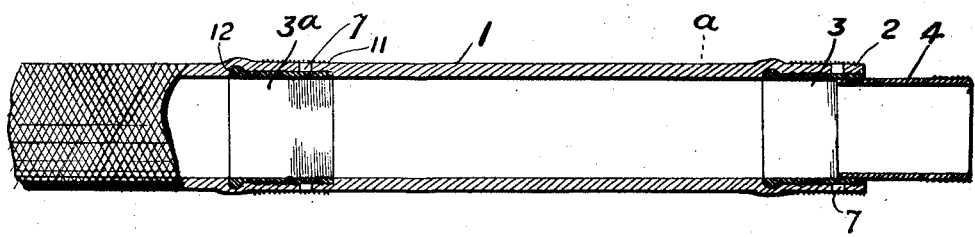

In the drawings 1 is a part of a length of flexible hose. The length is of course not important but for the sake of description it may be said that flexible hose of, for example, eight inches in diameter is frequently made in lengths of 25 feet, and it is both expensive and heavy. These are not matters of importance but are referred to to facilitate an understanding and correct conception of what is intended to be illustrated in Fig. 1, and not by way of limitation, but for the sake of description. The lengths of flexible hose are shown as provided at their ends 2 with coupling elements or sleeves 3 internally threaded for the detachable reception of externally threaded pipe sections 4 by which succeeding lengths of flexible hose are connected together. It is well known that flexible hose fails or ruptures in rear of and comparatively near to the end coupling sleeves 3, for example at *a* in Fig. 1, due no doubt to the bending which takes place in that locality. The coupling elements or sleeves are internally of substantially the same bore or diameter as the bore or diameter of the hose, and they are primarily attached to the hose in the sense that the hose is built around them. In fact the coupling sleeves 3 and 3ª are usually mounted in spaced relation on and along the length of a pole and the layers of duck and rubber are wound around the pole and sleeves and then vulcanized. Flexible hose of the present invention is satisfactory for the reason that when a length of it is ruptured and leaks as at *a*, the whole length does not have to be thrown away because there is a way of attaching the good portion of it to the pipe section 4, which is a means for connecting it to the coupling sleeve of another length of hose. By the present invention coupling sleeves or elements 3ª are provided in spaced relation throughout the length of hose 1 in the course of its manufacture or primarily, and some of these coupling elements 3ª may be operatively disposed in respect to one of the ends of the length of hose and the rest of these coupling sleeves or elements 3ª may be operatively disposed in respect to the other ends of the length of hose. The number of coupling sleeves or elements 3ª provided between the ends of the length of hose is not important and may be increased or diminished.

Figure 2:
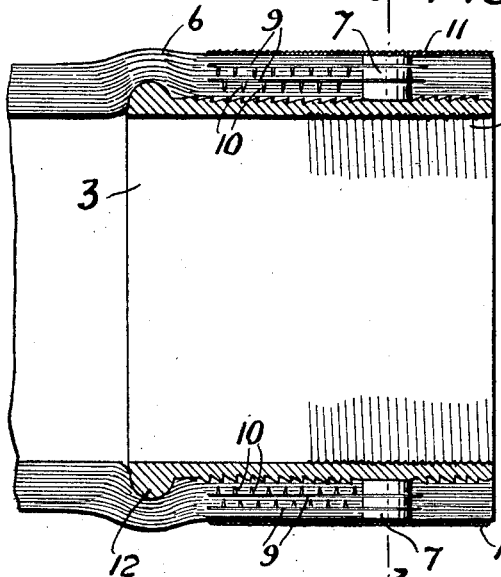
Fig. 2 is a view drawn to an enlarged scale and illustrating details of construction.
Figure 3:
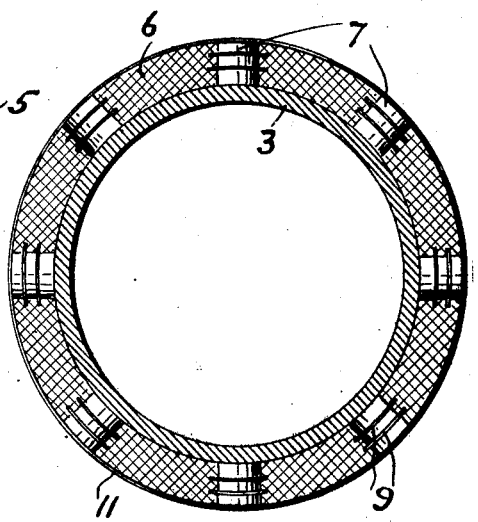
Fig. 3 is a section on the line 3—3 of Fig. 2.
Figure 4:
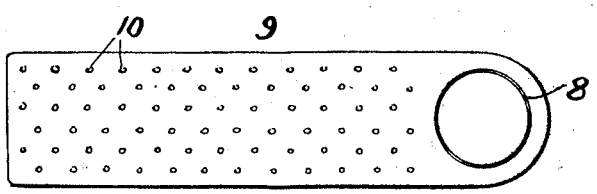
Fig. 4 is a top or plan view drawn to an enlarged scale of one of the anchor plates.

As shown in Figs. 2 and 3 the coupling elements or sleeves are of metal and are internally threaded as at 5 for engagement with the external thread on the pipe sections 4 and are externally ribbed or serrated for engagement with the inner surface of the body 6 of the hose. The coupling elements or sleeves are also shown as provided with spaced radially arranged projections 7 that extend through the wall 6 of the hose to the outer surface thereof and they serve two purposes. One purpose is to receive a wrench when the pipe section 4 is applied, and another purpose is to pass through holes 8 in anchor plates 9 provided with a plurality of pins 10 that are driven into the layers that make up the body of the wall 6. The function of the anchor plates is to firmly connect the hose and the coupling element. The number of anchor plates may be increased or diminished. 11 are wires or clamps that may be applied around the exterior of the hose to bind it onto the coupling elements. 12 is a rounded rib that may be provided on the inner end of the coupling element or sleeve and its purpose is to relieve the bending strain to which the hose is subjected.

The operation of the improved flexible hose length may be described as follows:

In the event of the rupture as at *a* of the wall of the hose in rear of the coupling element or sleeve 3 connected with the pipe section 4, the ruptured end of the hose is cut off and the pipe section 4 detached from the coupling sleeve or element forming part of the hose length which has been cut off and then the pipe section 4 is screwed into the next coupling element or sleeve as 3ª, thus the good part of the hose, that is the part to the left of 3ª, is available for use. In this operation the projections or spurs 7 are important because they receive the wrench or wrenches employed and the anchor plates 9 and their pins insure the maintenance of a good and satisfactory bond or connection.

In the event of a rupture between any two sleeves, for example at the intermediate portion of a length of hose, the ruptured part between the sleeves can be cut out leaving the sleeves available for connecting the two parts of the length of hose. In such case the sleeves are threaded at each end for the reception of parts 4.

It will be obvious to those skilled in the art to which the invention relates that modifications may be made in details of construction and arrangement without departing from the spirit of the invention which is not limited to such matters or otherwise than as the prior art and the appended claims may require.

I claim:

1. Flexible hose having a duck and rubber wall and internally provided throughout its length with spaced immovable coupling elements available for repair use by cutting off ruptured portions of the wall of the hose, substantially as described.

2. A flexible hose length having an uninterrupted wall and internally provided at its end and at intervals throughout its length with spaced and permanently and immovably internally threaded metal coupling sleeves of substantially the same bore as the bore of the hose.

3. Flexible hose having an immovable coupling element embedded in the intermediate portion of the surface of its inner wall and available for repair use, substantially as described.

4. Flexible hose internally provided at intervals throughout its length with spaced coupling sleeves having radially arranged projections that extend through and to the outer surface of its wall.

5. Flexible hose having in combination coupling sleeves provided with radially arranged projections extending into its wall, and anchor plates provided with a plurality of pins and engaging said projections and embedded in said wall.

6. Flexible hose internally provided both at and between its ends with spaced and immovable coupling sleeves of which some are operatively disposed in respect to one end of the hose and of which others are operatively disposed in respect to the other end of the hose.

HOWARD W. GOODALL.